C. D. MILLER.
AUXILIARY WINDSHIELD.
APPLICATION FILED DEC. 16, 1919.

1,386,418.

Patented Aug. 2, 1921.

INVENTOR.
CHESTER D. MILLER
BY A. B. Bowman
ATTORNEY

UNITED STATES PATENT OFFICE.

CHESTER D. MILLER, OF LOS ANGELES, CALIFORNIA.

AUXILIARY WINDSHIELD.

1,386,418.  Specification of Letters Patent.  Patented Aug. 2, 1921.

Application filed December 16, 1919. Serial No. 345,361.

*To all whom it may concern:*

Be it known that I, CHESTER D. MILLER, a citizen of the United States, residing at Los Angeles, in the county of Los Angeles and State of California, have invented certain new and useful Improvements in Auxiliary Windshields, of which the following is a specification.

My invention relates to auxiliary wind shields which are mounted adjacent the ends of the conventional automobile wind shields and extend backwardly at an angle to break the wind or forwardly at an angle to provide more wind and the objects of my invention are: first, to provide an auxiliary wind shield of this class which is adjustable and in which the glass plate may be readily moved upwardly and downwardly or adjusted to various angles relatively to the conventional wind shields; second, to provide new and novel clamp means for securing the auxiliary wind shield to the post of the conventional wind shield; third, to provide a novelly constructed, double pivot member for supporting the wind shield and fourth, to provide a wind shield of this class which is very simple and economical of construction, durable, easy to install, easy to adjust, readily made applicable to the different makes of vehicles now in use and which will not readily deteriorate or get out of order.

Figure 1:
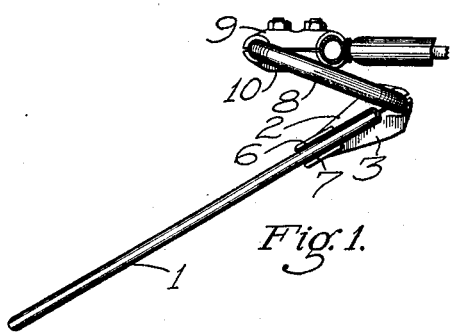
Figure 3:
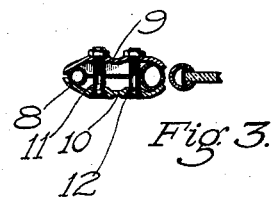
Figure 4:
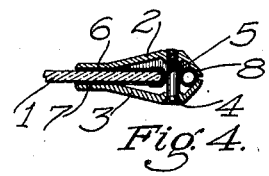
Figure 2:
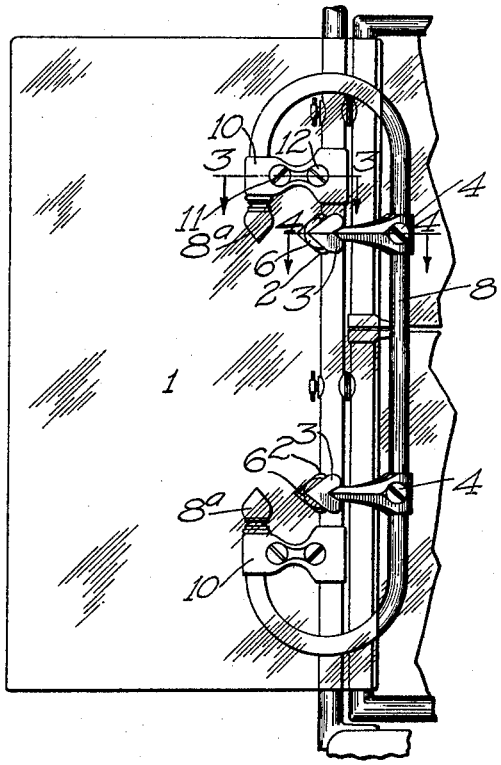
Figure 5:
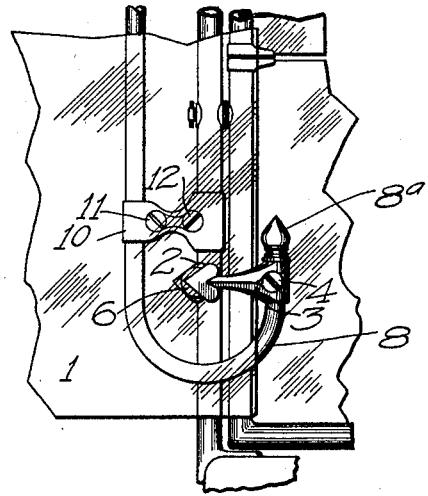

With these and other objects in view as will appear hereinafter my invention consists of certain novel features of construction, combination and arrangement of parts and portions as will be hereinafter described in detail and particularly set forth in the appended claims, reference being had to the accompanying drawings and to the characters of reference thereon which form a part of this application, in which:

Figure 1 is a top view of my device shown in position ready for use in connection with the ordinary wind shield post and showing said ordinary wind shield post in section; Fig. 2 is a rear elevational view of my wind shield; Fig. 3 is a sectional view through 3—3 of Fig. 2; Fig. 4 is a sectional view through 4—4 of Fig. 2 and Fig. 5 is a fragmentary rear elevational view of the device shown in a slightly modified form from that of the other views of the drawing.

Similar characters of reference refer to similar parts and portions throughout the several views of the drawings.

The shield member 1, clamp members 2 and 3, bolt 4, cushions 5, 6 and 7, support 8, clamp members 9 and 10, and bolts 11 and 12 constitute the principal parts and portions of my auxiliary wind shield.

The shield member 1 is a transparent member preferably of glass and shaped as desired, in this case I have shown it rectangular. This shield member 1 is supported by means of a pair of clamping devices each formed by clamp members 2 and 3 with a bolt 4 for securing them in proper relative position to each other and mounted between said clamp members on the one side of the bolt is the support member 8 and on the other side of the bolt is the shield member 1. Between the shield member 1 and the extended ends of the clamp members 2 and 3 are resilient washers 6 and 7 adapted to form cushions between the member 1 and the extended end of the members 2 and 3. There is also provided a resilient cushion between the edge of the member 1 and the bolt 4 as shown best in Fig. 4 of the drawings.

The bolt 4, clamping the members 2 and 3, together secure the member 1 in position in the clamps as well as secure the clamps to the support 8. This support 8 is provided with curved ends so that the extended ends are parallel with the main portion of the support 8 and the extended ends are provided with enlarged portions $8^a$, and mounted on the extended ends adjacent these enlarged portions are a pair of clamps formed by the clamp members 9 and 10 which are secured together by means of two bolts 11 and 12. Between the bolt 11 and the ends are the ends of the supports 8 and adapted to be secured to said support by means of the bolt 11 and between the bolt 12 and the ends is the supporting post for the ordinary wind shield and the members 9 and 10 are secured thereto by means of the bolt 12 so that the members 9 and 10 are secured to the ordinary wind shield post and the ends of the support 8 by separate means. In the modified form of construction shown in Fig. 5 the clamping members 2 and 3 are secured to the extended ends of the support 8 while the clamp members 9 and 10 are secured to the main portion, the form and structure of the parts being the same.

Though I have shown and described a particular construction, combination and arrangement of parts and portions I do not wish to be limited to this particular construction, combination and arrangement but desire to include in the purview of my invention the construction, combination and arrangement substantially as set forth in the appended claims.

It is obvious that with this construction there is provided an auxiliary wind shield which may be adjusted in varying positions relatively to the conventional wind shield; that the shield is movable on triple axes thus providing great variance; that the clamp members between the support 8 and the auxiliary wind shield post are constructed so that they clamp the separate members independently so that one may be clamped more tightly than the other.

Having thus described my invention what I claim as new and desire to secure by Letters Patent, is:

1. An auxiliary wind shield including a transparent shield member, a supporting member consisting of a member curved near its opposite ends, providing spaced apart parallel portions, a pair of clamp members with their one end clamped to said shield member and with their opposite ends clamped to one of said parallel portions, a pair of clamp members secured to the other parallel portion of said supporting member and the conventional wind shield post and separate means for clamping same.

2. In a device of the class described, a transparent shield member, a one piece member with offset parallel portions at its opposite ends forming three spaced apart parallel portions and clamp members connecting said one piece member to said transparent shield member pivotally and substantially in line with the longitudinal edge of said shield member, and other clamp members connecting said one piece member to the wind shield post.

3. In a device of the class described, a transparent shield member, a one piece member with return parallel portions at its opposite ends forming three spaced apart parallel portions and clamp members connecting said one piece member to said transparent shield member pivotally and substantially in line with the longitudinal edge of said shield member, and other clamp members connecting said one piece member to the wind shield post, said clamping members each comprising a pair of spaced apart members with oppositely disposed engaging ends.

In testimony whereof, I have hereunto set my hand at San Diego, California, this 5th day of December, 1919.

CHESTER D. MILLER.